(12) United States Patent
McGregor et al.

(10) Patent No.: US 9,420,260 B2
(45) Date of Patent: Aug. 16, 2016

(54) METHODS AND APPARATUS FOR 3D IMAGING AND CUSTOM MANUFACTURING

(71) Applicants: Scott L McGregor, Campbell, CA (US); Ray K Alley, Desert Hot Springs, CA (US); Akien Maclain, Hayward, CA (US)

(72) Inventors: Scott L McGregor, Campbell, CA (US); Ray K Alley, Desert Hot Springs, CA (US); Akien Maclain, Hayward, CA (US)

( * ) Notice: Subject to any disclaimer, the term of this patent is extended or adjusted under 35 U.S.C. 154(b) by 0 days.

(21) Appl. No.: 14/104,303

(22) Filed: Dec. 12, 2013

(65) Prior Publication Data
US 2015/0170416 A1 Jun. 18, 2015

(51) Int. Cl.
*G06T 15/00* (2011.01)
*H04N 13/02* (2006.01)
*G06T 19/20* (2011.01)
*G06T 17/00* (2006.01)
*H04N 13/00* (2006.01)

(52) U.S. Cl.
CPC ............ *H04N 13/0203* (2013.01); *G06T 17/00* (2013.01); *G06T 19/20* (2013.01); *G06T 2210/41* (2013.01); *G06T 2219/2021* (2013.01); *H04N 13/0221* (2013.01); *H04N 13/0239* (2013.01); *H04N 13/0242* (2013.01); *H04N 2013/0074* (2013.01)

(58) Field of Classification Search
CPC . G06T 15/00; G06K 15/1849; B29C 67/0088
USPC ............ 345/419, 420, 428; 382/154; 358/1.9; 700/15, 98
See application file for complete search history.

(56) References Cited

U.S. PATENT DOCUMENTS

| | | | |
|---|---|---|---|
| 7,756,325 B2* | 7/2010 | Vetter et al. | 382/154 |
| 8,175,734 B2* | 5/2012 | Fogel et al. | 700/98 |
| 8,190,272 B2* | 5/2012 | Crothers et al. | 700/15 |
| 8,488,197 B2* | 7/2013 | Abeloe | 358/1.9 |
| 8,693,056 B2* | 4/2014 | Abeloe | 358/1.9 |

OTHER PUBLICATIONS

Remondino et al, 3D Modeling of Close-Range Objects: Photogrammetry or Laser Scanning?, Videometrics VIII, proc. of SPIE-IS&T Electronic Imaging, SPIE Vo. 5665, 2005, 216-225.*
Remondino et al, Turning Images Into 3-D Models, IEEE Signal Processing Magazine, Jul. 2008, pp. 55-64.*

* cited by examiner

*Primary Examiner* — Phu K Nguyen

(57) ABSTRACT

The invention provides machines and systems for generating faithful 3D geometric models that correspond to the shape of an imaged 3D physical object, for storing, transmitting, and transforming those 3D models, and for manufacturing 3D objects based upon those models. The invention also provides processes for such capture, transmission, storage, and transformation of the 3D models and manufacturing of objects from those models.

14 Claims, 11 Drawing Sheets

Figure 4: Transdermal Illumination

Figure 6: Ear Surround

FIG 7 Right Panel background

Back Panel background

METHODS AND APPARATUS FOR 3D IMAGING AND CUSTOM MANUFACTURING

CROSS-REFERENCE TO RELATED APPLICATION

The present application is related to and claims priority from prior provisional application number 61739729, received by the USPTO on 20 Dec. 2012, entitled "METHODS AND APPARATUS FOR 3D IMAGING AND CUSTOM MANUFACTURING", the contents of which are incorporated herein by this reference and are not admitted to be prior art with respect to the present invention by the mention in this cross-reference section.

BACKGROUND OF THE INVENTION

This invention relates to providing methods and apparatus for improved three-dimensional (3D) imaging and custom manufacturing. More particularly this invention relates to providing methods and apparatus making objects requiring very close fits for comfort, retention or performance, wherein some body parts vary so significantly that even a small number of standard sizes cannot address the requirement.

Before the industrial revolution, all items were hand crafted, though not all were custom fit. During the industrial revolution, standardized objects became cheap to create due to automation. But custom fit solutions remained expensive and made to order. For some objects, a single size and style could meet the requirements of most buyers, and automation was a good solution. But for items like shoes, one size fits all was not a good compromise. Still the cost advantages of automation were so substantial, that manufacturing in a few standard sizes was a good compromise to address both cost and fit. With the advent of standard sizing, commerce changed and you could purchase ready-made goods such as shoes in a variety of sizes.

However, some objects require very close fits for comfort, retention or performance, and some body parts vary so significantly that even a small number of standard sizes cannot address the customer requirements. One object that falls in this category is a custom fit earpiece such as is typically found on hearing aids. Failure to get a perfect seal causes undesirable acoustical results such as feedback. For this reason, custom fit earpieces remain made-to-order. To date this has been an expensive process largely performed by hand-craftsmanship.

For this reason low cost custom fit objects, manufactured on demand, and potentially manufactured at the point of sale, has remained largely a dream.

OBJECTS AND FEATURES OF THE INVENTION

A primary object of this invention is to provide a means of capturing and storing the three dimensional geometry objects.

A second object of this invention is to reduce the time, cost and expertise required to capture, transmit and store such 3D geometries.

A third object of this invention is to use such captured 3D geometries to manufacture and deliver to a consumer a custom object or custom fit objects, on demand, at any desired location, including at the point of sale.

There has long been a desire to create custom fit objects on demand, at the point of purchase, but such automated manufacturing systems generally do not currently exist. Thus, an additional object of this invention of this invention is fulfilling that desire by combining the necessary technologies for capturing customized or personalized 3D geometries, and for manufacturing items designed to fit those geometries exactly.

A further primary object and feature of the present invention is to provide such a system that is efficient, inexpensive, and handy. Other objects and features of this invention will become apparent with reference to the following descriptions.

SUMMARY OF THE INVENTION

We here disclose methods and apparatus we have developed for capturing the geometries of, and for manufacturing, three-dimensional objects.

The geometry of an object fitting within the imaging volume can be captured three dimensionally (referred to herein as "scanning"). A wide variety of 3D objects can be scanned, e.g., a model, figurine, and biometric features. Even biological and biometric features such as fingers, face, nose, or your ear can be imaged and their geometries captured. The 3D objects, once imaged are converted into 3D geometric models. The imaged objects may be replicated, or custom fit. Their replicas may be shaped to conform to the negative space (i.e., negative shape) they create. For instance, captured ear geometries may be used to design and manufacture custom fit earpieces. Once imaged, additional modifications may be done to the geometry model, eliminating the need to physically modify a copied device or custom fit shape.

Object geometry data can be transferred across the Internet, or stored in the Internet servers (referred to as "in the cloud"), ready to be manufactured at any desired location at any time. Manufacturing may be done using additive manufacturing techniques (referred to as "3D printing"), or negative manufacturing techniques (e.g. "milling machines") in a variety of different materials.

By analogy to a fax machine that scans an image at one location and reproduces it at another, the invention allows objects to be 3D scanned at one location and reproduced at a different location. Or by analogy to a copy machine, it may reproduce a copy in the same location. Or by analogy to a network of printers connected to a data storage device, it may reproduce a copy at any later time at any of the 3D printer or milling machine locations.

Objects may be manufactured at the same location as the scan takes place with available materials and local 3D printer/milling machine station capabilities, enabling convenient replication near to the scanning point. Or they may be manufactured at a remote location where other materials or alternate fabrication methods may be available, and then shipped to the consumer.

We also disclose a business process that enables a consumer to capture 3D object geometries, to design and manufacture the 3D objects based on those geometries. This can include not only strict replication of the scanned object, but also deriving new objects based on the scanned geometries. A particular embodiment of this process supports making custom fit items based on scans of body parts, such as the manufacture of earpieces custom designed to fit the 3D shape of the purchaser's ears.

While most any object can be imaged and manufactured, in a preferred embodiment we image ears geometries that are used to manufacture custom-fit earpieces. These earpieces fit the contours of your ears, and may also be customized for hearing protection or for attachment to the specific geometries of a variety of headsets for listening to a media player, phones, tactical communications, hearing aids and other audio devices or sources.

BRIEF DESCRIPTION OF THE DRAWINGS

These and other features and advantages of the invention will be more readily understood from the following detailed description of the invention that is provided in connection with the accompanying drawings, in which.

DETAILED DESCRIPTION OF THE INVENTION

Figure 1:
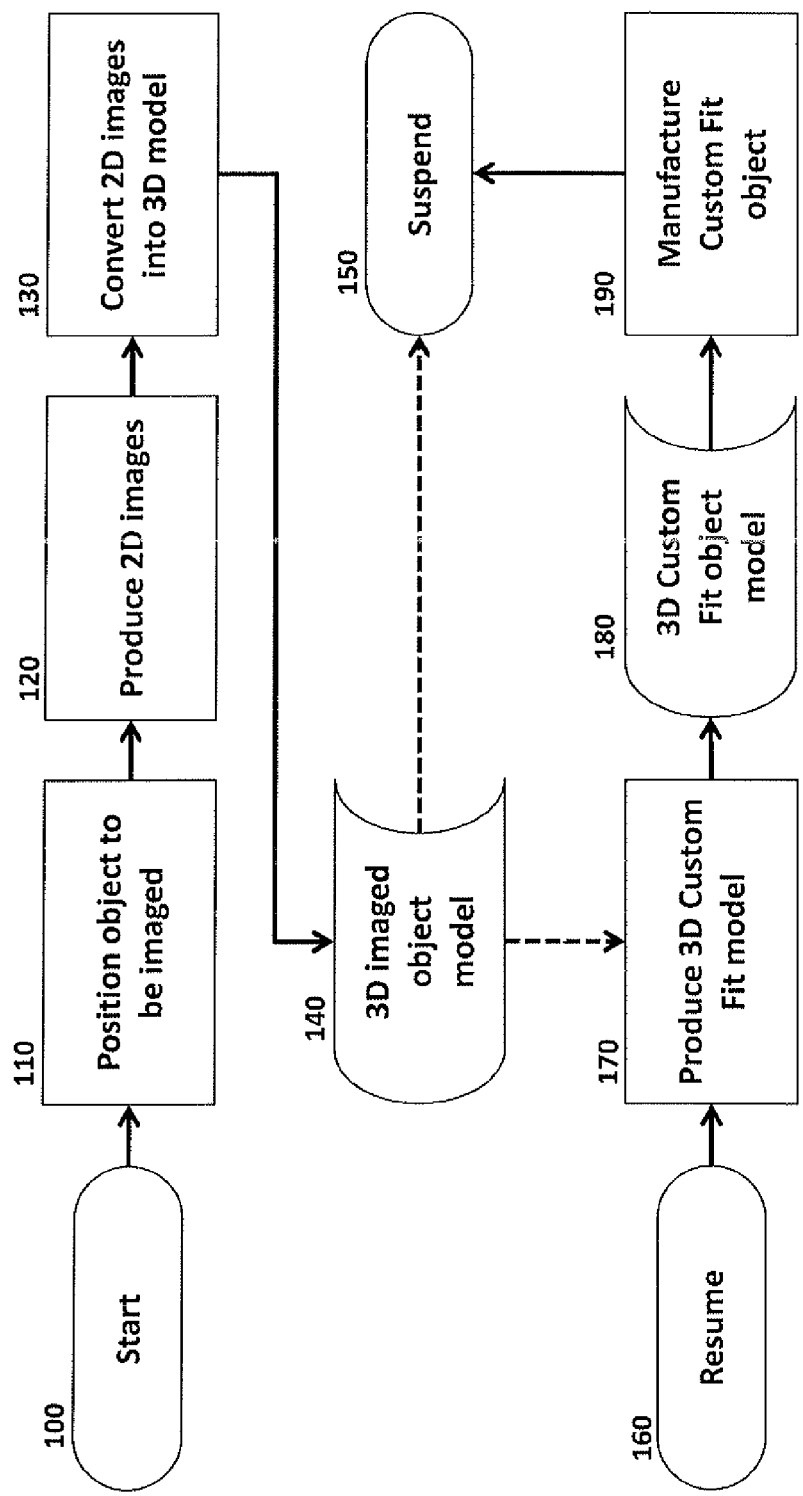
FIG. 1 shows a flow chart of the Custom Fit manufacturing Process.

Referring to FIG. 1, it shows a flow chart of a custom fit manufacturing process as follows.
1. Step 100: A user desiring to have a custom object manufactured for him or her arrives at the custom fit manufacturing station.
2. Step 110: The user positions an object, e.g., a body part, to be imaged in the imaging zone (an imaged object).
3. Step 120: The imaging zone acquires two-dimensional (2D) images of the object and any other necessary information needed to digitally reconstruct the object's 3D geometry. The necessary information acquired depends on imaging method used, but may include absolute or relative positions of the cameras and light sources and their expected imaging pattern when imaging a flat plane.
4. Step 130: A computational unit converts the 2D images and necessary information into a 3D imaged object model of the imaged object.
5. Step 140: The computational unit stores the 3D imaged object model in the storage unit. This 3D imaged object model data may be used immediately (via step 170) to make one or more of the custom objects, or it can be stored for use at a later time (steps 150 and 160).
6. Step 150: If no more of the custom objects will be manufactured at this time, the process is suspended until the user wishes to manufacture the custom objects based on the stored 3D imaged object model.
7. Step 160: Once the user's 3D imaged object model is in storage it may be retrieved at any future time, to manufacture a new custom object, e.g., a custom-fit earpiece or a casting mold for the desired object. When the user desires to manufacture the new custom object, the 3D imaged object model data are passed to the next available manufacturing unit at the time of manufacture.
8. Step 170: Upon request by the user when he or she is ready to manufacture the new custom object, the 3D imaged object model is retrieved into a computation unit where it is transformed into the 3D object or 3D custom-fit object model. The parameters of this custom fit model may be set by the user or by a technician, or determined automatically, depending on application and user preferences.
9. Step 180: The resulting 3D custom-fit object model, e.g., a custom-fit earpiece data model, is transferred from the computation unit to a 3D Manufacturing station for manufacturing. The 3D custom-fit object model data may be stored as a permanent data storage file if the user is likely to create another just like it later, or it may be transferred as a temporary data store if it is likely to only have a one-time use.
10. Step 190: The 3D manufacturing station, which may be a 3D additive manufacturing device (e.g., 3D printer), or another computer-aided design (CAD)/manufacturing system such as a Computer Numerical Control (CNC) machine, then manufactures a custom or custom-fit 3D object according to the specification in its 3D object model. When manufacturing is complete, the 3D manufacturing station returns to a suspense state (step 150) until the next manufacturing request is made.

Figure 2:
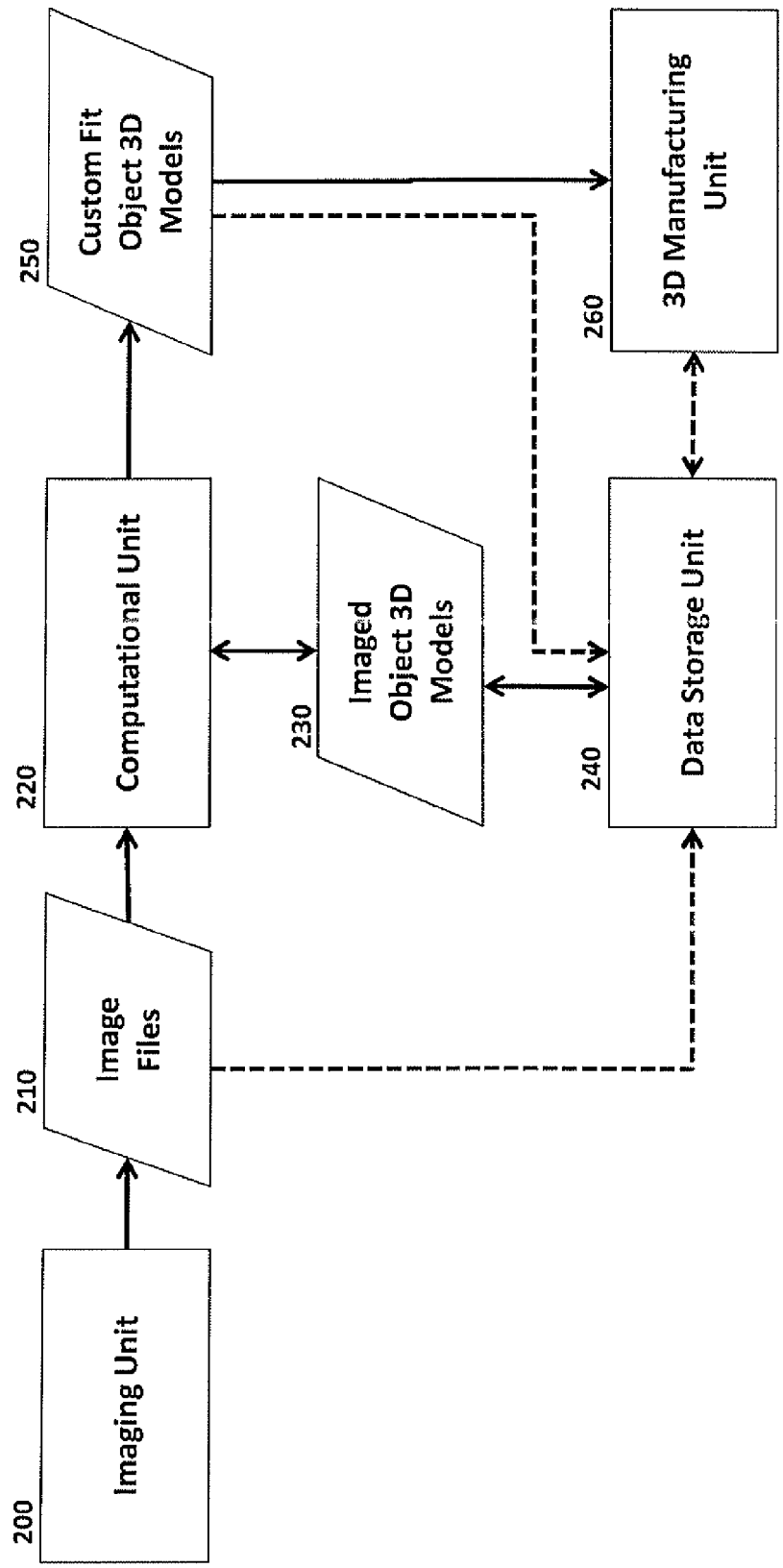
FIG. 2 shows a system diagram and data flow chart, showing the units that comprise the invention.

Referring to FIG. 2, it shows a system diagram and data flow chart, showing the elements that comprise the invention. Note that although only one unit of each type is shown, the invention includes configurations with multiple imaging units, computational units, data storage units and manufacturing units. These units may be physically integrated in a single physical package, or they may be distributed and connected by a communications network, such as WiFi in a store, or via the Internet, enabling the computational unit to use cloud computation by remote servers and the data storage unit to use cloud data storage services.

200: Imaging Unit. Imaging unit, 200, is composed of one or more imaging devices, such as the cameras or scanners capable of generating 2D or 3D image files of an object, depending on the 3D technology applied. The cameras and light sources may move in order to sense the geometry of the object from different planes cut through the object, or to capture from different viewpoints, or fixed cameras may be used. Various light sources may be placed at one or more viewpoints or a combination of fixed and moving elements of the imaging unit may be used. The imaging unit may store the generated image files in the data storage unit for later access, or pass them directly to the computational unit.

210: Image Files. Image file, 210, generated by the imaging unit is used by the computational unit to create 3D models of the imaged objects that have not already been rendered.

220: Computational Unit. Computational unit, 220, may be a personal computer (PC), a server, or specialized hardware for computing and transforming 2D images into a 3D model. The computational unit interacts with the data storage unit, the imaging unit, and the 3D manufacturing unit.

230: Imaged Object 3D Model. Imaged object 3D model, 230, generated by the computational unit, holds personalized 3D geometry information defining shape of the imaged object, e.g., jewelry, a figurine, or a human ear.

240: Data Storage Unit. Data storage unit, 240, holds 3D models computed from the imaging data. These models may then be transformed into custom fit 3D data models that may or may not be stored long term. The data storage units may also store the imaging data prior to use by a computational unit.

250: Custom Object 3D Model. Custom object 3D model, 250, produced by the computational unit is derived from the geometry of the imaged object. The custom object 3D model is transformed as necessary for a desired purpose, e.g., the final custom shape or custom-fit of the imaged object, e.g., jewelry, models or figurines, or a custom-fit earpiece designed for a specific user and headset.

Step 260: 3D Manufacturing Unit. 3D manufacturing unit, 260, may be the 3D additive manufacturing station (3D printer), the CNC machine or other device that can manufacture the 3D object according to instructions contained in the 3D model.

Figure 3:
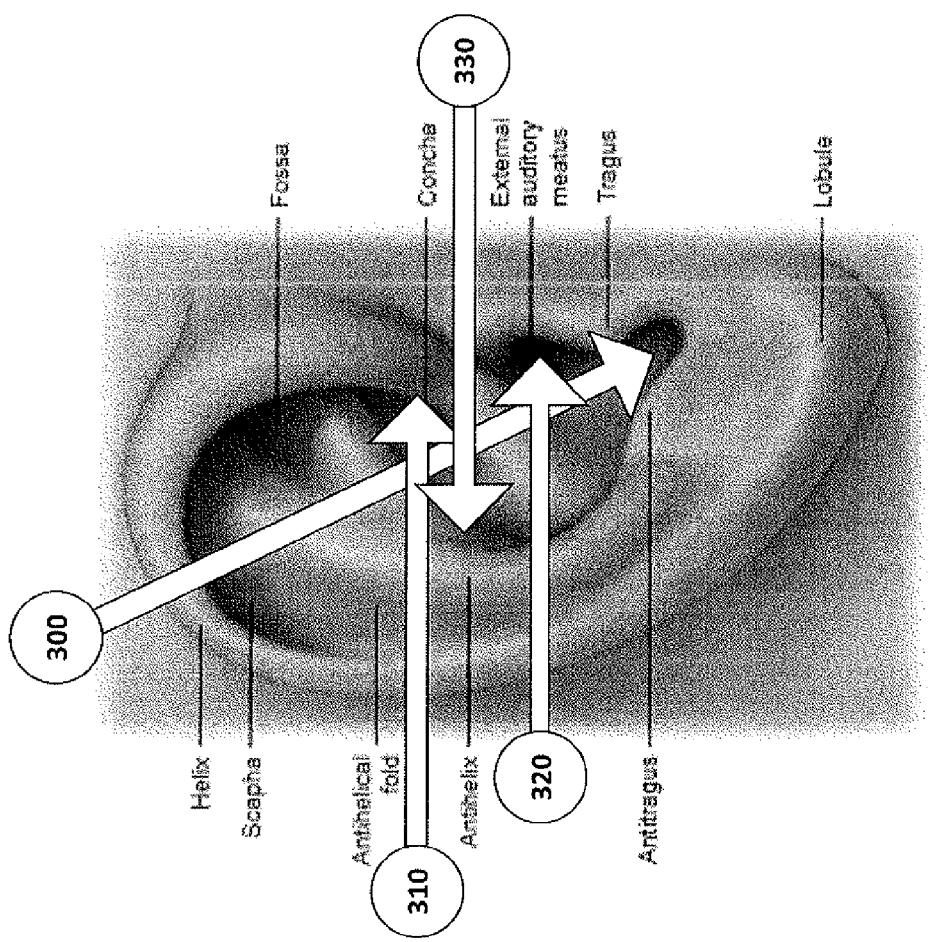
FIG. 3 shows a human ear and the 4 arrows point at 4 areas where shadows are likely if the ear is scanned from only a single vantage point.

Referring to FIG. 3, showing a human ear (ear) and the 4 arrows pointing at 4 areas where shadows are likely if the ear is scanned from only a single vantage point. The circles show horizontal locations where the best vantage point for positioning imaging and illumination sources to avoid shadows along the line of the attached arrow. A preferred embodiment includes multiple vantage points for imaging and illumination for ensuring sufficient imaging of the imaged object, i.e., the ear, and especially to capture sufficient biometric data of the ear to create a custom fit earpiece.

300: Location 300 is a good location for a vantage point and illumination to see into inter-tragus notch at base of bowl of the ear.

310: Location 310 is a good location for a vantage point and illumination to see into helix notch, where it overlaps anti-helix of the ear.

320: Location 320 is a good location for a vantage point and illumination of a visible part of ear canal.

330: Location 330 is a good location for a vantage point of ridge of the anti-helix that sometimes extends over concha bowl.

Figure 4:
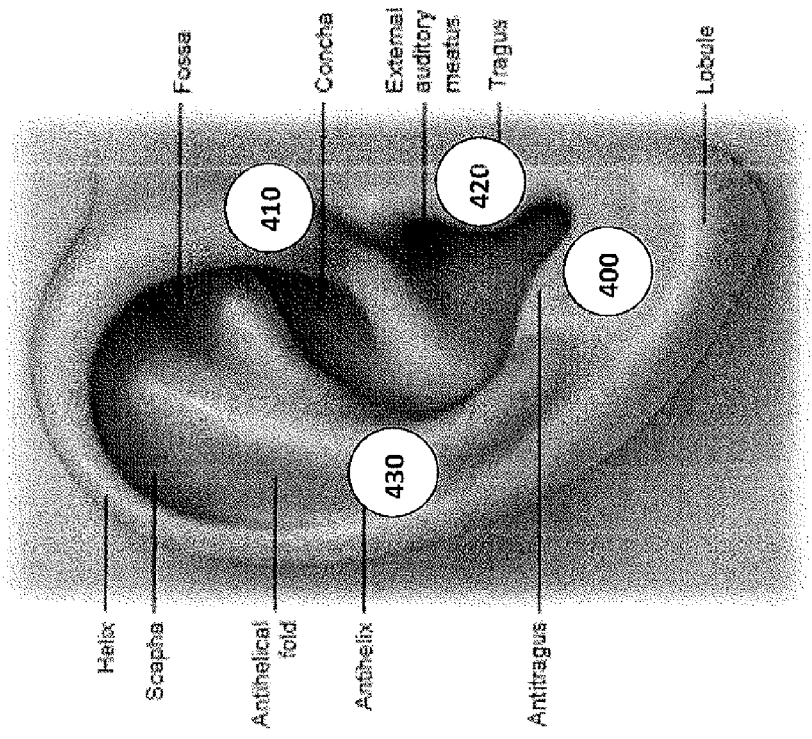
FIG. 4 shows a human ear and the 4 circles are at the 4 points where low wattage lights may be placed next to the skin to diffuse through the skin and illuminate transdermally the structures that lie underneath the ridge of skin.

Referring to FIG. 4, it shows a human ear and the 4 circles are at the 4 points where low wattage lights may be placed next to the skin to diffuse through the skin and illuminate transdermally the structures that lie underneath the ridge of skin.

400: Location 400 is a good location for illuminating the inter-tragus notch at the base of the bowl of the ear, and the lower back of the concha under the anti-helix.

410: Location 410 is a good location for illumination of the helix notch, where it overlaps the anti-helix.

420: Location 420 is a good location for illumination of the entrance to the ear canal.

430: Location 430 is a good location for illuminating under the ridge of the anti-helix that sometimes extends over the upper back of the concha bowl.

Continuing to refer to FIG. 4, it shows locations 400, 410, 420, and 430 where lights may be placed for transdermal illumination of the surrounding areas of the ear.

Figure 5:
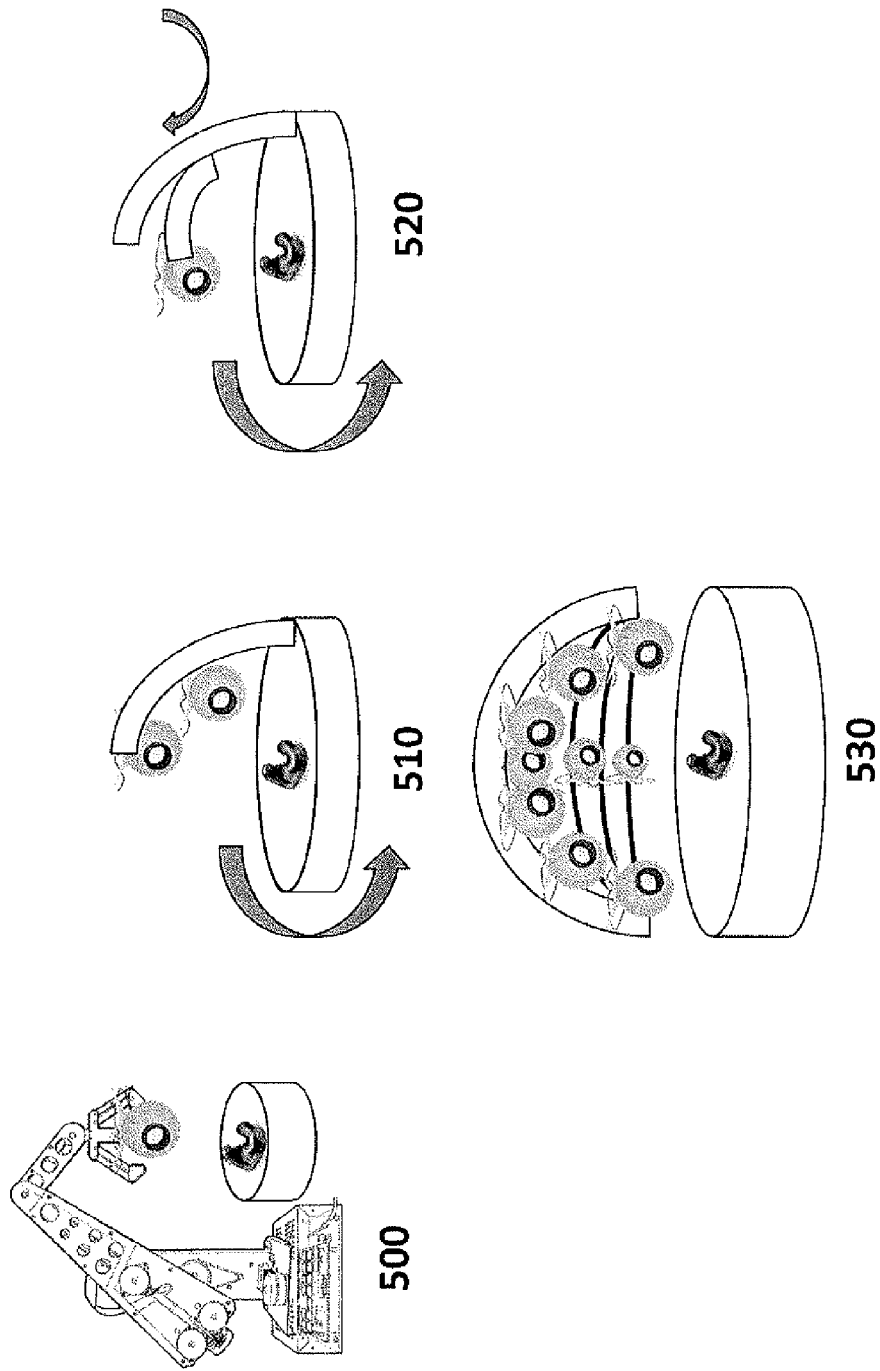
FIG. 5 shows four different mechanisms for positioning cameras for imaging a 3D object from multiple locations.

Referring to FIG. 5, it shows 4 types of mechanisms for positioning the cameras for imaging the 3D object from multiple locations.

500: Robot arm, 500, enables you to swing around the object being imaged to see it from any vantage point, enabling you to find the best viewpoint to see into concave areas of the 3D object.

510: A series of cameras, 510, placed on a hemispherical arm enable imaging the object from fixed elevations. By rotating the arm around the object it can be imaged from any azimuth direction.

520: By adding a second arm, 520, that pivots around a 45 degree elevation, a single camera can view the 3D object from any elevation between 0 degrees (equator) and 90 degrees (zenith). If the arm is placed at the equator, any elevation between 90 degrees (zenith) and −90 degrees (nadir) can be imaged. By rotating the arm around the object you can achieve any azimuth as well. Thus through a combination of the hemispherical arm and the second arm enable achieving full or nearly full hemispherical coverage. If the imaged object is on a pedestal or stake, the arms may be pivoted below the equator and thus captured with nearly full spherical coverage, allowing capture of the top and bottom of the object in a single model. Alternatively a object may be imaged in one orientation and then flipped vertically to capture the other side, and the two resulting models can be stitched together by software during the modeling step.

530: For applications where movement of the 3D object between frames is a concern, the 3D object can be imaged simultaneously from multiple fixed vantage point cameras.

Figure 6:
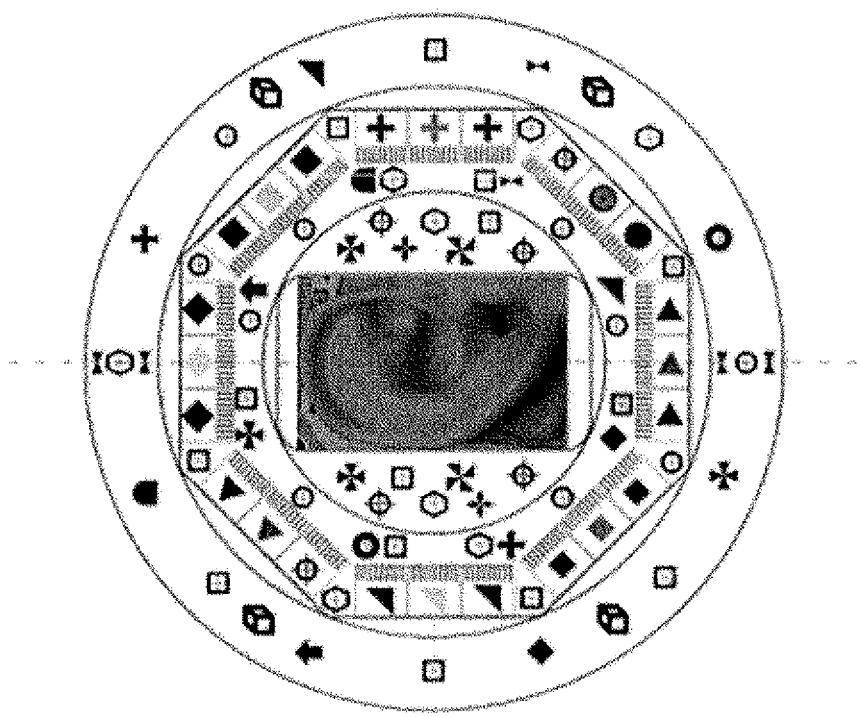
FIG. 6 shows a sample imaging target ring surrounding an ear.

Referring to FIG. 6, it shows a sample imaging target ring surrounding an ear. The imaging target ring has a number of marks on it which act as landmarks that allow the photogrammetry software to synchronize the same landmarks as seen from different vantage points. The imaging target ring also has markings of known size that allow the 3D models to be properly scaled.

Figure 7:
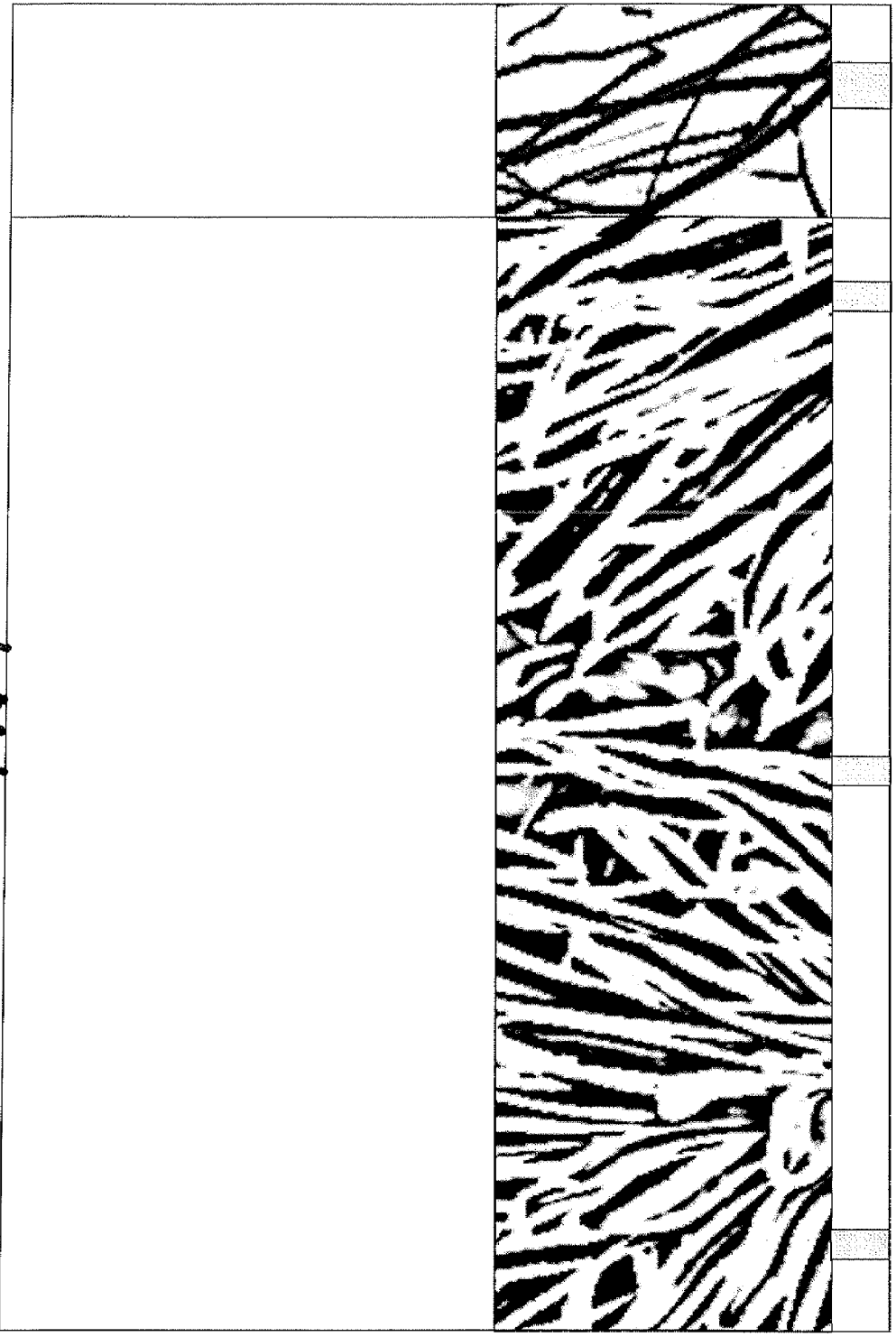
FIG. 7, it shows a sample right panel background.

Referring to FIG. 7, it shows a sample right panel background. Backgrounds are landmark target rich for the photogrammetry software to identify many landmark points so that we can triangulate well everywhere. This is especially important when the 3D object itself is smooth and lacks few target points. Because the imaged 3D object is between the camera and the floor or walls, we are better able to determine the precise edges from each vantage point. In our preferred embodiment we image in a hemispherical pattern, focused on the center of the floor of our box. At high elevation angles the camera will see only the floor and 3D object, but at low elevation angles this wall will be seen behind the 3D object. In our preferred embodiment we use high contrast nature photographs rather than synthetic or constructed images, because the photogrammetry landmark recognition models have been optimized for naturally occurring organic shapes. Each wall is a completely different image from each other wall to avoid any landmark confusion during modeling that could occur if there was repetition or symmetry.

Figure 8:
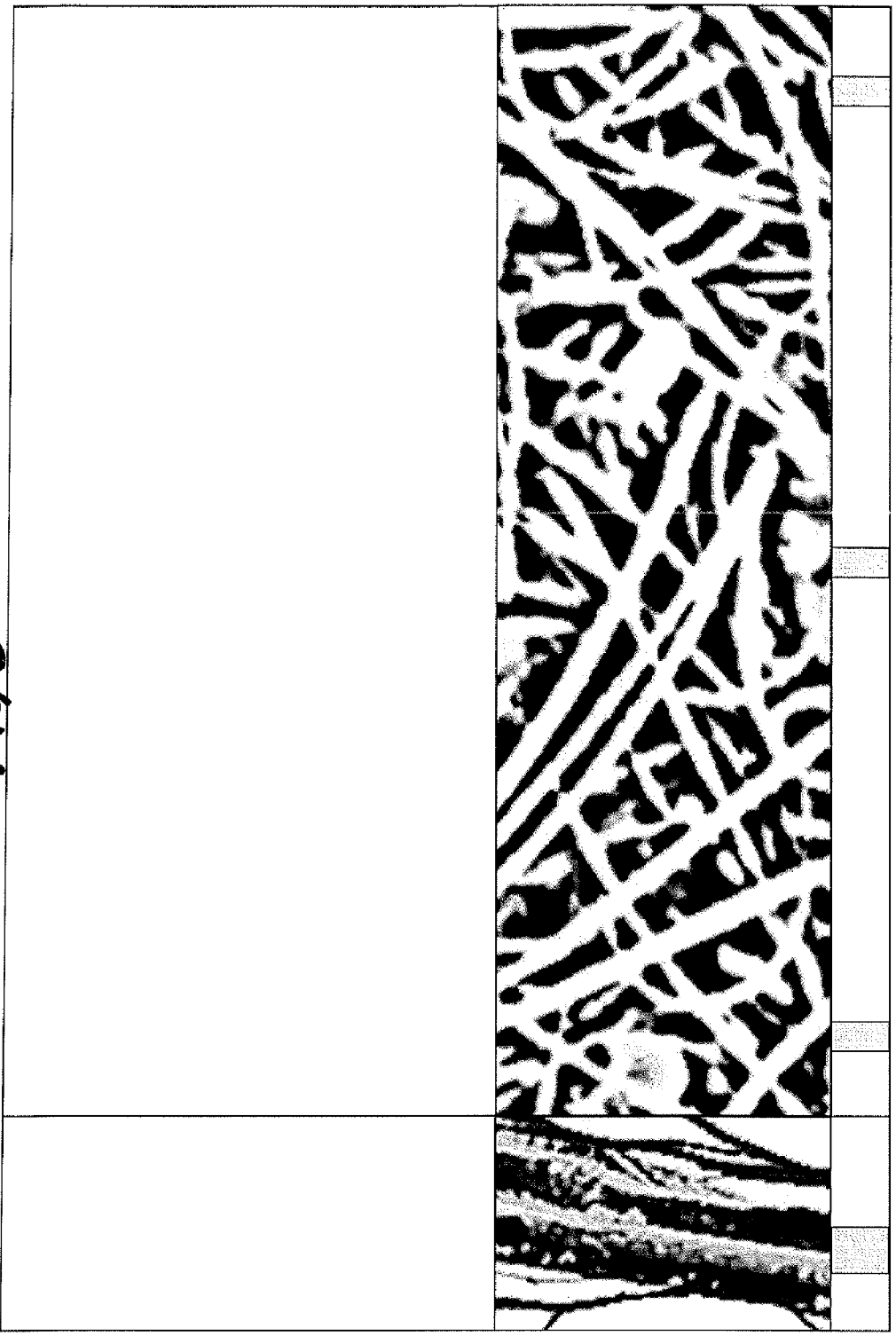
FIG. 8 shows a sample left panel background.

Referring to FIG. 8, it shows a sample left panel background. As with the right panel, front panel and back panel, this panel will be imaged from some camera positions when the camera is at a low elevation angle. This image shares characteristics of the other wall and floor designs. It is high contrast, irregular (random), non-repeating, and nonself-similar at different scales. Images that repeat or are self-similar at different scales can make it easy for the photogrammetry software to confuse two distinct different points as the same landmark, which will result in a distorted model of the 3D object. Selection of images such as these avoid these problems.

Figure 9:
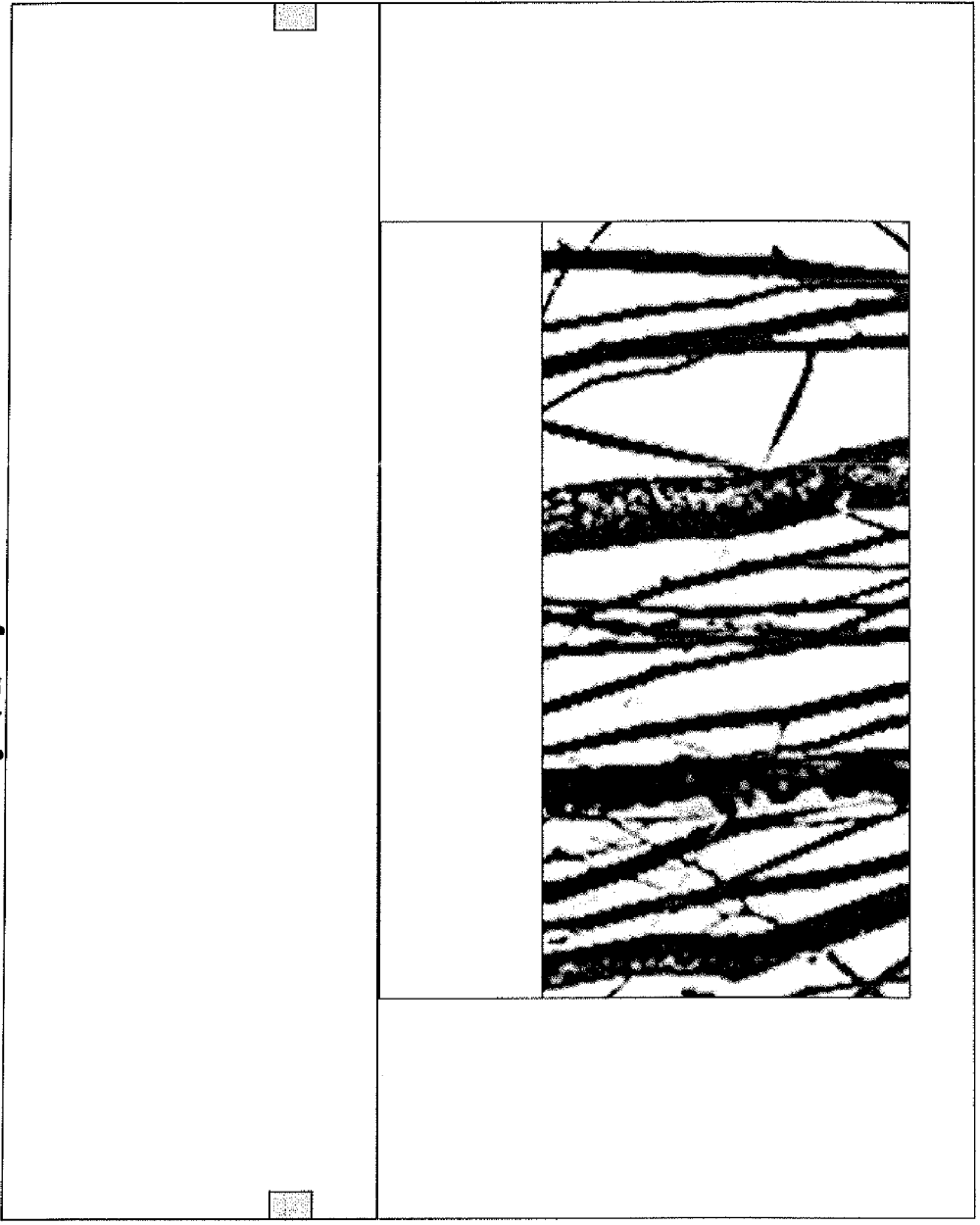
FIG. 9 shows a sample front panel background.

Referring to FIG. 9, it shows a sample front panel background. As with the right panel, left panel and back panel, this panel will be imaged from some camera positions when the camera is at a low elevation angle. This image shares characteristics of the other wall and floor designs, but is of a different object to ensure its landmarks won't erroneously be mapped to the same point on other walls. Differences in size or shape of the wall images are determined by the precise dimensions of the scanner, which may vary based on the 3D object being imaged.

Figure 10:
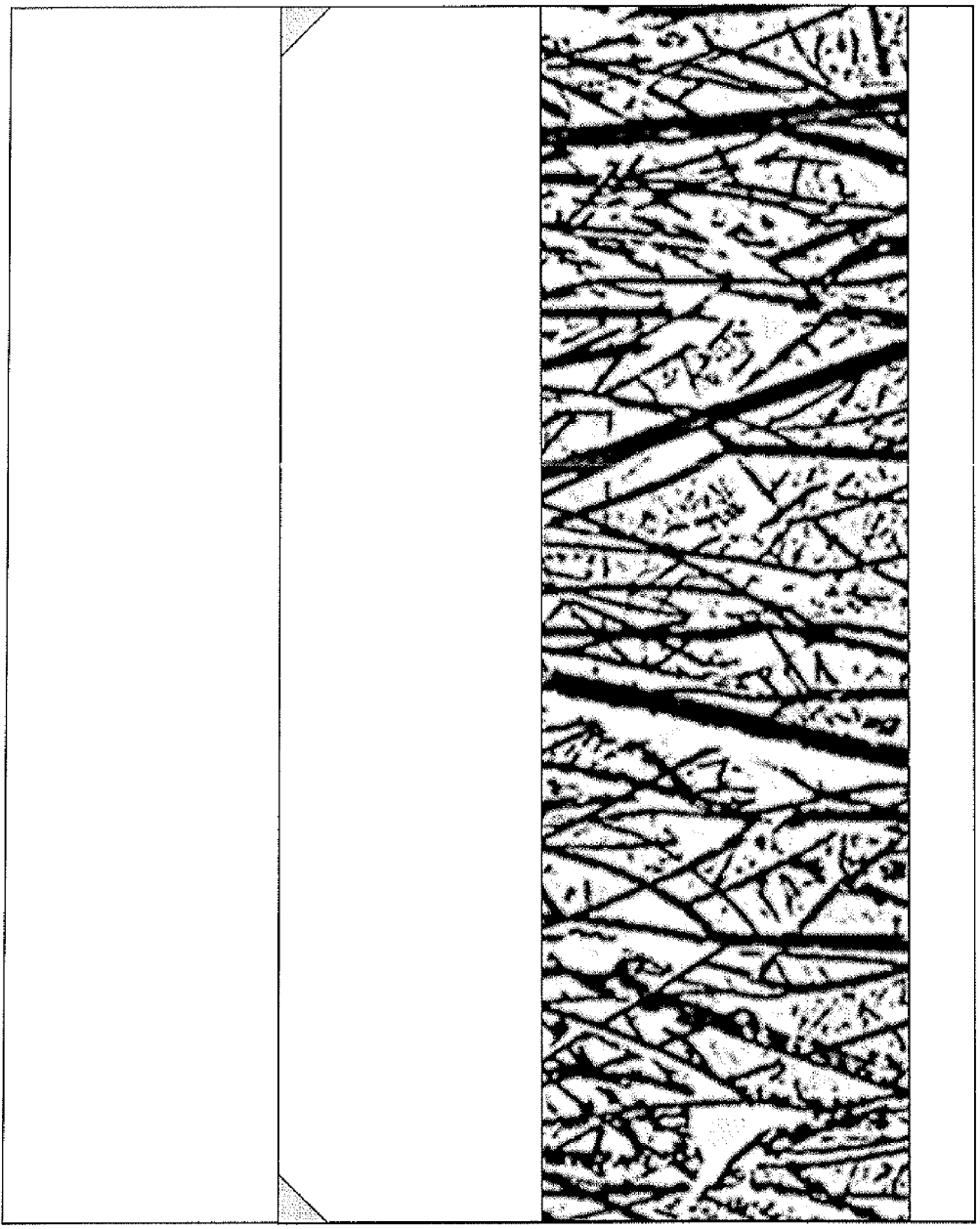
FIG. 10 shows a sample back panel background.

Referring to FIG. 10, it shows a sample back panel background. As with the right panel, left panel and front panel, this panel will be imaged from some camera positions when the camera is at a low elevation angle. This image shares characteristics of the other wall and floor designs, but is of a different 3D object to ensure its landmarks won't erroneously be mapped to the same point on other walls. Differences in size or shape of the wall images are determined by the precise dimensions of the scanner, which may vary based on object being imaged.

Figure 11:
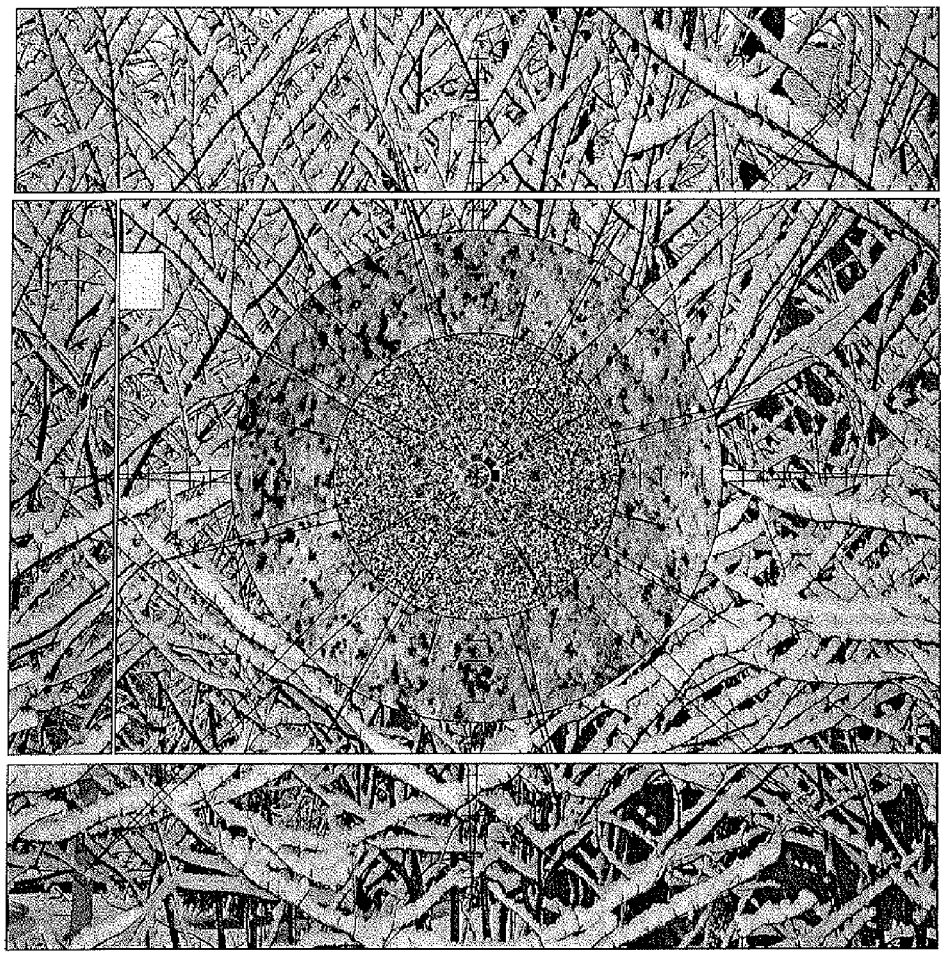
FIG. 11 shows a sample floor.

Referring to FIG. 11, it shows a sample floor background. As with the wall panel backgrounds, the floor background provides a target rich environment for finding landmarks that can be matched from image to image. Because the 3D object is placed on the floor parts of the floor are always visible unless the camera elevation is on the equator. The thin lines on the floor (circle and star pattern) are used in testing to verify cameras are operating from desired positions, and to initially set the dimensional scale and axes of the scanner using an image object of known dimensions and position. By specifying the exact dimensions and positions of known landmark points on the floor, we are able reverse the triangulation process to determine the precise camera positions where images were taken with respect to the same reference axes and scale. We store these positions in a "template" that we can use to provide automated scaling and cropping during normal processing. Our mechanicals and electronics ensure we use the same camera positions each time, thus we now know the precise camera positions used each time. Given the known distances between cameras, and the angles to common reference points in different images we are now able to accurately determine the scale of the unknown 3D object. Also since we know the actual distance of the floor and walls from the cameras, we can automatically crop the floor and walls from the model leaving only the intended 3D object modeled.

In a preferred embodiment, we can image either physical impressions of the ear (a convex object), or the ear itself (a concave object).

Creating a good 3D model of the ear is especially difficult for several reasons. Human skin is translucent and intense incident light, such as from a laser tends to both diffuse and reflect. This poses a problem for scanners relying on laser or structured light technologies that use incident light.

For this reason, in a preferred embodiment the inventors prefer using photogrammetry for capturing ear geometries, which has not been used for this purpose before.

However, a problem for photogrammetry is that for good results, you need to identify point landmarks from multiple vantage points that you can use in triangulation. Except for exceptionally freckled humans, most ears are largely featureless, which would make it difficult for photogrammetry to yield accurate results, which is one reason photogrammetry has not been used before for capturing ear geometries. Moreover, physical impressions taken from the ears are generally monochromatic, smooth with continuously varying curves, making it hard to find landmarks on the imaged target object. However, the inventors were able to work around this limitation by surrounding the ear with a printed ring or bowl marked with landmark points that enable photogrammetry to accurately identify these points, and when imaging impressions we captured images within an enclosed space with special backgrounds that provide many of the landmarks used for triangulation even though the target object lacks them. By imaging the ear and the surrounding landmarks we are able to capture the visible shapes with landmark points.

Additionally photogrammetry has not been used for capturing ears because photogrammetry requires the image to contain an object of known scale to get the size right. Since ears don't naturally have any features of precisely known size, this is a problem for photogrammetry. However, because we created the landmark points on a surrounding ring or bowl having a known size, we solved the scaling problem. This use of the landmark points enables photogrammetry as an acceptable solution for capturing ear geometries.

Additionally, because the photogrammetry apparatus consistently takes images from the same positions, we capture a test object of a known fixed size. And, because we already know the scale of the 3D object, rather than using triangulation to find its size and distance, we reverse the triangulation to find the distance of each camera from some of the registration points. This allows us to calculate the camera locations with precision. Since the device does not change its operating locations, we are able to detect the camera positions relative to each other.

As mentioned before, a disadvantage of laser line and structured light scanning methods for ear scanning is the translucency of skin which diffuses the incident light so it is no longer a well-defined point. An advantage of this embodiment using photogrammetry is that translucency of skin can actually be employed to better capture parts of the ear that are hard to directly illuminate.

We have identified four major ear features that must be well captured to achieve a good fit for custom fit earpieces. They are: (1) the outer part of the ear canal from the concha to the second bend, (2) the helix lock where the helix goes over the anti-helix, (3) the intertragal notch between the tragus and anti-tragus, and (4) the concha under the anti-helix ridge.

Again, referring to FIG. 3, which identifies camera and illumination positions for best imaging these areas, the size of the lighting elements and the cameras may make it difficult to simultaneously illuminate and image from these positions. And in some cases the ridges so completely curl over the concha or entrance to the ear canal that illumination of the area is nearly impossible. This is most significantly a problem around the ear canal.

An advantage of this preferred embodiment for an ear scanner is that by using photogrammetry we can turn the translucency of the skin from a disadvantage into an advantage. We can place light sources, such as low wattage LEDs proximate to the skin in these areas. The light will diffuse through the obscuring ridge of skin and illuminate the interior transdermally. For instance a light source proximate to the tragal fold will diffuse through that skin and illuminate the outer part of the ear canal. Proper placement of light sources can assist with transdermally illuminating the intertragal notch (with sources over the tragal fold and intertragus), the concha (on the antitragus and antihelix, and of the helix lock with illumination placed on top of the helix). Because these sources are outside of the concha area, they do not obscure imaging the interior of the concha from any viewpoint. They can in fact be hidden by the aforementioned ring or bowl that provides scale and landmark synchronization information for photogrammetry.

A preferred embodiment relies on multiple imaging vantage points. There are multiple ways to image from these vantage points, and different choices may be preferred based on whether the application is imaging an ear (subject to motion) or an ear impression.

Use of multiple cameras simultaneously capturing the target, can be advantageous for capturing ears, since it minimizes the time that user must interact with the scanner, and also minimizes the possibility of the ear moving between images which would confound the photogrammetric modeling.

For an object such as an ear impression, or piece of jewelry that is stationary, motion between image captures is not an issue, and cost may be reduced by reducing the number of the cameras and moving them between multiple viewpoints. At the limit a single camera may be employed, although depending on time vs. cost vs. redundancy tradeoffs other numbers of the cameras may be used in combination with motion.

There are many ways the cameras may be driven to their desired locations. These include a robot arm that can trace any path, rotational arms that drive the cameras around the object in an azimuth direction, elevational arms that can move the cameras up and down in elevation, combinations of azimuthal and elevational arms, or even hemispherical or helical screw tracks.

A preferred embodiment puts together the components necessary to make low cost custom fit manufacturing, including manufacturing at point of sale, a reality.

We image an object fitting inside the scanning zone. These may be simple objects like models, figurines or jewelry or complex objects like biometric features such as ears. Captures of 3D ear geometries, either directly from ears, or indirectly from negative space impression molds taken from ears, are used to design and manufacture custom fit earpieces using Computer Aided Design (CAD) and Computer Aided Manufacturing (CAM) software, and manufacturing technologies such as Additive Manufacturing (3D Printers) or computer numerically controlled machines that use negative manufacturing techniques.

Our invention can apply these methods to creation of many custom fit objects, but the manufacturing time can vary with the complexity, volume and number of materials comprising the final object. An object as small and simple as an earpiece or piece of jewelry could be manufactured in under an hour with existing manufacturing technologies, while an object as large or as complex as high performance shoe would likely take much longer with existing manufacturing techniques. For this reason, this preferred embodiment of the invention initially creates small, simple, single material goods such as jewelry, models, figurines, and custom fit earpieces. As manufacturing technology improves, we expect to produce more complex multiple material goods that have other components embedded in the product to enhance its usefulness or value, but still manufactured in a timely manner.

A preferred embodiment of this invention begins by addressing the question "Why is it so hard to get custom fit earpieces?". Over the last eighty years the hearing aid industry evolved from a standard "one size fits all" earpiece, to custom fit earpieces. One of the primary factors that led to the move to custom fit earpieces was the miniaturization of the hearing aid devices, which increasingly put the microphones closer and closer to the speakers.

This is a concern for the designer of hearing aids, because hearing aids must amplify the signal a great deal. But if the amplified sound reaches the microphone, "feedback" occurs and a painful screeching sound results. If a secure seal of the ear canal can be achieved, the amplified sound directed to the ear drum can be acoustically isolated from the microphone on the other side and the possibility of feedback is reduced. For this reason, the needs of the hearing aid industry has been driving the development of methods and apparatus for the capture of ear geometries and for manufacturing custom fit earpieces.

But once the technology existed for capturing ear geometries and produce custom fit objects, applications to other areas such as industrial hearing protection, music and communications also became possible.

Because of this connection to the growing hearing aid industry, the traditional way to produce such custom ear plugs, earpieces, adapters and components for hearing aids or communications devices has required consumers wanting such devices to visit a trained audiologist, who would inject a fast hardening putty into each of the consumer's ears. After the putty hardens (typically in 15-30 minutes), the audiologist would ship the ear impressions to a custom manufacturer. The manufacturer would then use the consumer's ear molds to construct an inverse mold, and then use the inverse mold to make a new object that was identical in shape to the molds that came from the consumer's ears. In the case of a hearing aid, music listening device or communications device, additional manufacturing steps might be required to construct a hole that could direct sound from the device's speaker through the custom earpiece to a part of the ear canal proximate to the ear drum.

The newly manufactured earpiece would be sent back to the original audiologist who would ask the patient to schedule another appointment where the audiologist would validate that the earpieces were sufficiently snug to prevent the feedback problem, yet not so tight that they were painful to wear. The high demands of these conflicting requirements, and the multi week process between each mold taking and fitting appointment made obtaining a very good impression the first time very important. This took some skill, especially to navigate the syringe around two separate "bends" in each ear canal, and without damaging the delicate eardrum. Capturing the deep geometry of the ear canal, allowing the hearing aid designer to place the end of the device as close to the ear drum as possible, and as far away from the microphone as possible was critical to success of hearing aid fittings.

One disadvantage of this method is that the original putty molds shrink over time, thus if the consumer needs a replacement earpiece or is fit for a different device at a future time, the consumer must replicate their visit to the audiologist and a new mold will have to be made.

With the advent of laser 3D geometry scanners, some manufacturers decided that rather than make the 2nd inverse mold they would use a laser scanner and create a digital 3D geometry data model of each original ear impression mold. Since the geometry model does not change over time the way the original molds do, this can be used to generate additional copies on demand without new molds. However, as the ear is a part of the human body which continues to grow over a lifetime, frequent re-captures are typically necessary in the Hearing Aid business where a tight fit to avoid feedback is most critical. A preferred embodiment of this invention facilitates capture of the geometries of such physical molds so they do not need to be shipped.

In addition, this growth rate is slow enough that in less demanding applications such as music listening or communications where feedback is not an issue, earpieces made based on geometries digitally captured at a single fitting could be adequate for many years or even decades.

Even with growing applications in noise protection and communications that were less demanding in their demands for capturing deep ear geometries, because of the potential damage to the ear drum if mold impression taking technique is poor, getting the initial ear molds continued to done primarily by trained medical professionals causing the initial mold taking process to be an expensive, inconvenient and time consuming process.

A preferred embodiment comprises a new way to capture this information that does not involve using putty, but would instead use optical means to capture ear geometries. This was further developed and perfected into the invention, which is disclosed below.

Methods for capturing 3D geometry information and building 3D CAD models are not new. Among the common methods for capturing 3D geometries are moving laser line scanners, structured light scanners, and photogrammetry to name a few. All of these methods for capturing 3D point cloud information can be used with preferred embodiments of this invention.

However, a problem for any imaging system is the problem of shadows. If the surface cannot be seen from the vantage point of the imaging device, or is not illuminated by an illumination device, the 3D model will have a defect. This is why 3D scanning is typically only used for capturing convex shapes which can be viewed from a single vantage point, or where the object can be placed on a carousel that rotates in a predictable way in front of a fixed camera and light source.

In terms of manufacturing an object that should fill the negative space of a concavity (i.e., negative shape), the defects (areas not imaged or not imaged well) in the negative shape will result in voids between the manufactured object and the imaged object.

To ensure that we do not suffer from significant optical shadowing, we capture images from multiple vantage points to maximize accurate 3D rendering.

Photogrammetry is the science of determining 3D geometric properties from 2D photographic images. Photogrammetry does an excellent job of recreating 3D objects. In its simplest embodiment, stereo cameras image an object from two locations. Geometrical positions illuminated and visible to both the cameras can be determined by running rays from each camera to the common point. By adding more vantage points and circumnavigating the object we can determine the geometry of the entire object. In fact, entire cityscapes can be captured with images taken while circling or in multiple flyovers.

The same technology, photogrammetry, is used to create 3D films for the movie industry. Photogrammetry techniques are very good for capturing shapes; however, unless distances between vantage points are known precisely, they depend on knowing the size of features in the images to scale properly. One embodiment of the invention that uses photogrammetry takes advantage of the apparatus to ensure that we know the scale of the imaged objects by first deriving and then reusing known camera positions to yield both scale and better precision in the shape capture.

Laser scanning technology has been around for decades and is another excellence source capable of 3D rendering. It depends on having a laser and camera at a known distance apart. A point on the surface of the object illuminated by the laser reflects to the camera. We know by the laws of optics that the angle of incidence equals the angle of reflectance. Therefore if we know the angle of the laser relative to the base line connecting the laser and camera, we know two angles and one side of the triangle they form. By triangulation, we can calculate the distances and thereby derive the geometry. By creating a laser line, we can capture many points with a single image and thus speed up the process.

A newer image technique called Structured-Lighting extends this principle even further, painting many lines across the surface in patterns that allow the system to resolve which visible line corresponds to which transmitted light and angle, thus allowing multiple "lines" to be captured in a single image.

A disadvantage of the laser and structured light methods is that they rely on painting the surface of the object with bright light. If the illuminated surface reflects or diffuses light, a single incident light ray may wind up illuminating multiple reflected points, or the area of diffusion, making it hard to determine the precise location of the illuminated point with accuracy. This is particularly a concern for imaging human skin, such as the surface of the ear, since it is subject to both diffusion of bright light and irregular reflections.

These and many more methods exist for acquiring 3D geometries.

While the combination of the 3D scanner and 3D printer or CNC machine is useful for duplicating a shape or its inverse, the 3D printer can print any 3D model, including ones that are designed from scratch without an initial scan. By placing a 3D printer or CNC machine at a point of sale location, on demand manufacturing with mass customization reaches a new level of convenience, and eliminates shipping costs and delays.

A preferred embodiment of this invention consists of an imaging unit, a computation unit, a data storage unit and a 3D manufacturing unit. The imaging system, computation unit, and printer may all be tightly integrated in a single device, or they may be fielded as multiple devices that intercommunicate. For instance, some computations may be done by servers on the Internet, and data may also be stored on remote servers, and 3D scanners may be at one location but 3D printers used in manufacturing may be in yet another location.

A user of the invention places an object to be imaged at the focal zone of the imaging unit. For instance, in one embodiment jewelry, models, household décor, figurines or physical ear impressions are placed in the image zone and a 3D model of the imaged object is created in order to create an exact replica. In a preferred embodiment, an ear is imaged in order to create an object that is not a replica of the ear, but rather to a custom fit earpiece that fills the negative space of the concha (bowl) of the ear.

The output of this imaging unit is a set of 2D images. The image data may be stored in a data storage unit before being passed on to the computation unit.

The 2D images are converted into 3D imaged object models using common algorithmic image analysis tools that calculate 3D geometries using photogrammetry, laser line triangulation, structured light or other 3D imaging methods. This 3D data transformation is done by a computation unit. The resulting 3D imaged object model is stored in the data storage unit.

The 3D imaged object model (in a preferred embodiment: a 3D ear model) is then translated by the computation unit, using 3D CAD software, to smooth edges, fill areas not well captured, remove excess material, to extrude extra material to provide a place for anchoring any attachments, or perform other customization desired. This translation creates the desired 3D Custom object model that will be used in manufacturing. In a preferred embodiment where we create custom fit earpieces, these transformations are typically to create an anchor hole to hold the post of a headset, and to route a sound tunnel from the end of the headset through the earpiece into the ear canal. The output of this transformation step is a 3D Custom object model.

In the final step of the fabrication process of a preferred embodiment of this invention, we convert the 3D custom object model into a finished manufactured object using automated 3D manufacturing methods. These fabrication processes take place in the 3D manufacturing unit. In a preferred embodiment, we create finished products such as: jewelry, models, household décor, figurines, or earpiece are made using 3D additive manufacturing and printing of the desired object. However, in other embodiments of the invention can use subtractive methods such as CNC machines and other manufacturing technologies to develop products to meet customer needs.

Operation

The User positions the object to be fitted (e.g. jewelry, models, house hold décor, figurines, physical ear impression or an ear), into the imaging zone of the apparatus. The imaging apparatus captures images of the object.

In the next step, the captured 2D images are output from the imaging unit into the computational unit. This process converts the captured 2D images into a 3D geometry model of the imaged object to be fit or replicated. We use a pattern background that avoids replication or self-similar elements to provide a target rich environment for triangulating even if the object being imaged lacks its own landmarks. We also can add additional landmarks to the target object by sprinkling powder, painting a surface pattern using pigment or light, or using a different material containing contrast markers embedded within the mold making material to ensure that the molds so produced have lots of optical landmarks.

In the following step, the 3D imaged object model is stored in the data storage device for retrieval when the user wishes to manufacture a custom-fit device. In most cases this data is immediately used as input to the object transformation process, although once stored the process may be repeated at this step to create additional custom or custom-fit objects as replacements for use with new accessories (e.g. different headset models) without the need for re-imaging.

In the succeeding step, the 3D model of the imaged object is transformed into a 3D model of the desired custom object to be manufactured. This may be an entirely automated computation process, or may involve additional input from a technician depending on the complexity of the transformation desired.

Once the desired 3D custom or custom-fit object model has been produced, it is passed to the 3D manufacturing apparatus that then physically replicates the custom fit object based on its 3D model. This final manufacturing step may be a simple single step: a direct to 3D print operation; or it may involve multiple steps including making of casting molds and subsequent casting of parts, or various finishing operations.

Alternatives

There are many kinds of cavities and surfaces that can be 3D scanned using preferred embodiments of this invention, and many custom fit objects can be manufactured from the resulting 3D geometry files, as we disclose here.

In a preferred embodiment of the invention the application of these methods and apparatus are used to scan the 3D geometries of human ears, and to create custom fit ear pieces that may be used for noise reduction and hearing protection; or as part of a personal or portable sound delivery system such as a music player in-ear headset; or as part of an ear piece for a communications system, such as a bluetooth cellular phone, call center telephone or tactical radio walkie-talkie.

While there are several advantages to applying the invention to this specific application, there is nothing about the invention which would limit its application to 3D imaging of other objects, nor to manufacturing physical replicas or custom-fit or custom designed objects of other types.

For instance, a preferred embodiment of this invention can be applied to several other medical applications, including capture of the 3D geometry of other body parts, such as feet, vaginal, nasal, oral or anal cavities, or combined with laparoscopy, of internal body cavities or blood vessels. From these 3D scans, custom fit orthotics, vaginal, oral or anal inserts, stents and other custom fit 3D objects can be produced.

Beyond medical applications, these same techniques can be used to produce custom fit personalized jewelry, garments, or sculptures and other adornments, plus home décor, figurines or sculptures.

Furthermore, preferred embodiments of this invention are not limited to the scanning of biological surfaces or production of custom fit objects only for use in biological contexts. Preferred embodiments of this invention can also be applied to creating a custom fit patch to a hole or crack in a ceiling, floor, wall or other surface, or to join two or more objects securely.

While our preferred implementation of this invention uses optical imaging methods, it should be understood that our invention can work using non-visible electromagnetic radiation as well, including infrared, ultraviolet, microwave and radio waves and x-rays. It may also be extended to other forms of energy waves such as ultra-sound or computed tomography where 2D images are transformed into 3D images.

What is claimed is:

1. A method of making a second 3-dimensional object that fits to a first 3-dimensional object to be fitted comprising:
   a) a method of creating a 3-dimensional geometry model comprising imaging said first 3-dimensional object with an imaging device; and
   b) a method of transforming said 3-dimensional geometry model into said 3-dimensional object with a transforming device;
   c) wherein said transforming device is structured and arranged to select said second 3-dimensional object conforming to negative shape of first said 3-dimensional object or conforming to positive shape of said first 3-dimensional object;
   d) wherein the method of creatin said 3-dimensional geometry model comprising imaging said first 3-dimensional object is provided with said imaging device comprising:
      i) photogrammetry apparatus configured for creating more than one image from more than one known non-repeatable position; and
      ii) landmarks structured and arranged for identifying more than one common reference point in multiple images using any combination of target coloring, background, pattern, and registration point markers relating to said first 3-dimensional object;
      iii) wherein not all identified said common reference points exist in each of said multiple images;
      iv) wherein scale of said first 3-dimensional object is calculated from said registration point markers associated with said known non-repeatable 3-dimensional positions;
      v) wherein said known non-repeatable 3-dimensional positions are non-self-similar at different scales;
      vi) whereby enabling using triangulation to find distance of each camera from selected registration points associated with said 3-dimensional object to be fitted;
   e) wherein the method of creating said 3-dimensional geometry model comprising imaging said first 3-dimensional object is provided with an illumination apparatus comprising:
      i) selecting an indirect light source that is structured and arranged with selected multiple wavelengths to enhance transdermal diffusion of its light;

ii) wherein said indirect light source is placed proximate to an area to be imaged of said first 3-dimensional object;
iii) wherein said indirect light source is structured and arranged to transmit said selected multiple wavelengths of light for indirectly illuminating said area to be imaged through transdermal diffusion of light from said indirect light source;
iv) whereby transmitted said selected multiple wavelengths of light diffuses into said area to be imaged;
f) wherein the method of creating said 3-dimensional geometry model comprising imaging said first 3-dimensional object further comprises a method for capturing said 3-dimensional geometry model of said first 3-dimensional object to be fitted comprising:
  i) covering a first surface of said first 3-dimensional object to be fitted with optically contrasting landmarks;
  ii) wherein said optically contrasting landmarks comprise applying light and shadow in a non-repeating pattern;
  iii) wherein said optically contrasting landmarks are structured and arranged for identifying more than one common reference point in said multiple images;
  iv) wherein not all identified said common reference points exist in each of said multiple images;
  v) whereby enabling registration points associated with said first surface of said first, dimensional object;
g) wherein the method of creating said 3-dimensional geometry model comprising imaging said first 3-dimensional object further comprises a method for capturing said 3-dimensional geometry model of said first 3-dimensional object to be fitted comprising:
  i) covering a second surface of said first 3-dimensional object to be fitted with said optically contrasting landmark;
  ii) wherein said optically contrasting landmark comprises contrasting particles structured and arranged to create random landmark points embedded within said optically contrasting landmarks;
  iii) whereby said random landmark points are introduced in otherwise featureless smooth regions;
  iv) wherein embedded said random landmark points are embedded at depths that are optically-thin relative to said selected multiple wavelengths' optical penetration into said 3-dimensional object to be fitted with said optically contrasting landmark;
  i) wherein said optically contrasting landmarks are structured and arranged for identifying more than one common reference point in said multiple images;
  ii) wherein not all identified said common reference points exist in each of said multiple images;
  iii) whereby enabling registration points associated with said second surface of said 3-dimensional object to be fitted;
h) wherein the method of creating said 3-dimensional geometry model comprising imaging said first 3-dimensional object further comprises a method for capturing said 3-dimensional geometry model of said first 3-dimensional object to be fitted:
  i) wherein said first 3-dimensional object to be fitted is imaged against a patterned background of non-repeating elements and non-self-similar elements:
  ii) whereby said patterned background of non-repeating and non-self-similar elements are structured and arranged to provide a target rich environment for selecting said landmarks that can be accurately ranged; and
i) wherein the method of creating said 3-dimensional geometry model comprising imaging said first 3-dimensional object further comprises a method for improving capture of said images of said first 3-dimensional object to be fitted by imaging said 3-dimensional object:
  i) wherein said first 3-dimensional object to be fitted is imaged using said selected multiple wavelengths of light exhibiting varying bright spots and shadows;
  ii) wherein said optically contrasting landmarks are structured and arranged for identifying more than one common reference point in said multiple images;
  iii) wherein not all identified said common reference points exist in each of said multiple images;
  iv) whereby said multiple wavelengths of light exhibiting varying bright spots and shadows are structured and arranged to provide a target rich environment for selecting said landmarks that can be accurately ranged;
j) whereby said second 3-dimensional object custom fits with said first 3-dimensional object to be fitted.

2. The method of claim 1 wherein the method of creating said 3-dimensional geometry model comprises a shape capture:
  a) wherein multiple fixed position non-calibrated cameras are structured and arranged for capturing multiple images simultaneously; and
  b) wherein scale of said 3-dimensional object to be fitted is determined by first deriving scale from said image and then reusing known camera positions to yield both scale and precision in said shape capture.

3. The method of claim 2 wherein an imaging apparatus surrounds said first 3-dimensional object to be fitted and provides images of known size that can be used to scale said 3-dimensional object to be fitted.

4. The method of claim 3 wherein said imaging apparatus surrounds said 3-dimensional object to be fitted with a calculating apparatus that is structured and arranged for:
  a) providing said common reference points;
  b) imaging both said 3-dimensional object to be fitted and said common reference points for creating said 3-dimensional geometry model;
  c) calculating all 3-dimensional shapes for creating said 3-dimensional geometry model; and
  d) digitally removing said common reference points and any surrounding objects not inclusive of said 3-dimensional object to be fitted;
  e) whereby creating said 3-dimensional geometry model.

5. The method of claim 4 wherein the method of creating said 3-dimensional geometry model comprises imaging:
  a) wherein said photogrammetry apparatus is configured for creating multiple image viewpoints that circumnavigate a path around said 3-dimensional object to be fitted, using photogrammetry;
  b) wherein multiple fixed position cameras are structured and arranged for capturing multiple images simultaneously comprising said shape capture; and
  c) wherein scale of said 3-dimensional object to be fitted is determined by first deriving and then reusing known camera positions to yield both scale and precision in said shape capture.

6. The method of claim 4 wherein the method of creating said 3-dimensional geometry model comprising imaging said first 3-dimensional object to be fitted with said imaging device comprises digitally storing and retrieving said 3-dimensional geometry model.

7. The method of claim 4 wherein the method of creating said 3-dimensional geometry model comprising imaging said first 3-dimensional object to be fitted with said imaging device and manufacturing custom objects based on stored said 3-dimensional geometry model.

8. The method of claim 7 wherein said custom objects comprise custom fit earpieces.

9. The method of claim 1 wherein the method of creating said 3-dimensional geometry model comprising imaging said first 3-dimensional object to be fitted utilizing an analytical apparatus comprising:
   a) an imaging unit structured and arranged for acquiring more than one 2-dimensional image file;
   b) a computational unit structured and arranged for transforming said 2-dimensional image file into said 3-dimensional geometry model of said 3-dimensional object to be fitted;
   c) a data storage unit structured and arranged for storing said 3-dimensional geometry model;
   d) a computational unit structured and arranged to translate said 3-dimensional geometry model of said first 3-dimensional object to be fitted into a 3-dimensional model of an intended custom object; and
   e) at least one 3-dimensional manufacturing unit structured and arranged to produce a 3-dimensional physical object based upon said 3-dimensional model of said intended custom object.

10. The method of claim 9 wherein any unit of said analytical apparatus may be physically separated from any other unit and in which there exists a communication link interconnecting all said units of said apparatus.

11. The method of claim 1 wherein the method of transforming the 3-dimensional geometry model into said second 3-dimensional object comprises a method for manufacturing said custom object comprising:
   a) capturing 2-dimensional images of first 3-dimensional object to be fitted;
   b) producing said 3-dimensional geometry model of the imaged object from said 2-dimensional images;
   c) transforming said 3-dimensional geometry model of said first 3-dimensional object to be fitted into a 3-dimensional geometry model of said custom object to be manufactured; and
   d) manufacturing said custom object based on said 3-dimensional geometry model of said custom object to be manufactured using said 3-dimensional manufacturing process.

12. The method of claim 1 wherein said first 3-dimensional object to be fitted that lacks suitable reference points for generating said 3-dimensional model via photogrammetry comprising:
   a) surrounding said first 3-dimensional object to be fitted with a reference point apparatus that provides such reference points;
   b) imaging both said second 3-dimensional object and the surrounding reference points together in the same images;
   c) calculating 3-dimensional shapes of the combined imaged area; and
   d) and digitally removing the surrounding object from said 3-dimensional model;
   e) whereby generating said 3-dimensional model of said first 3-dimensional object to be fitted, but lacking suitable reference points for generating said 3-dimensional model via photogrammetry.

13. The method of claim 1 wherein said first 3-dimensional object to be fitted lacks images of known scale and further comprises:
   a) using photogrammetry by surrounding said first 3-dimensional object to be fitted with a scale apparatus that provides such objects or images of known scale;
   b) imaging both said 3-dimensional object to be fitted and the surrounding reference points together in the same images, calculating the scale of the combined imaged area; and
   c) digitally removing the surrounding object from the model.

14. The method of claim 1 comprising a method for determining scale of said first 3-dimensional object to be fitted comprising:
   a) imaging an object of unknown dimensions;
   b) using reverse light ray tracing to determine location of said light sources and said camera locations that are structured and arranged for ensuring scaling of the captured object;
   c) using known said camera positions to determine scale of said first 3-dimensional object to be fitted and location of any surrounding floor and wall images; and
   d) cropping said surrounding floor and wall images from said model, leaving only said 3-dimensional geometry model;
   e) whereby determining said scale of said first 3-dimensional object to be fitted.

* * * * *